United States Patent [19]

Carson

[11] Patent Number: 4,675,532

[45] Date of Patent: Jun. 23, 1987

[54] COMBINED STARING AND SCANNING PHOTODETECTOR SENSING SYSTEM HAVING BOTH TEMPORAL AND SPATIAL FILTERING

[75] Inventor: John C. Carson, Corona del Mar, Calif.

[73] Assignee: Irvine Sensors Corporation, Costa Mesa, Calif.

[21] Appl. No.: 795,988

[22] Filed: Nov. 6, 1985

[51] Int. Cl.⁴ .............................................. H01J 40/14
[52] U.S. Cl. ..................................... 250/578; 250/332; 250/334; 244/3.16; 358/209
[58] Field of Search ............... 250/578, 332, 334, 339, 250/370 G, 370 E; 358/209; 244/3.16

[56] References Cited

U.S. PATENT DOCUMENTS 4,178,522 12/1979 MacLennan et al. ............... 250/334
4,403,148 9/1983 Coon et al. .......................... 250/332
4,479,149 10/1984 Yoshioka et al. ................... 358/294

Primary Examiner—Eugene R. LaRoche
Assistant Examiner—David Mis
Attorney, Agent, or Firm—Thomas J. Plante

[57] ABSTRACT

A photodetector sensing system is disclosed which combines staring and scanning features. By providing both temporal and spatial filtering, many system benefits are obtained. Each pixel in the viewed scene has a "dedicated" filter, which receives signals only from that pixel. By integrating time spaced signals from the same pixel, the filter maintains the staring effect of a two-dimensional detector array. A single detector may view a plurality of pixels, thereby improving resolution. A single pixel may be viewed by a plurality of detectors, thereby providing redundancy to correct for detector failures. The signal from each detector, after amplification, is first sent through a spatial, high frequency filter, and then is set to one of a plurality of parallel temporal, low frequency filters, which time share the detector. Synchronizing means are provided for ensuring that each temporal filter always receives its time spaced signals from the same source. Any suitable scanning mechanism may be used. The system may be used either to distinguish a moving target from a non-moving background, or to distinguish a non-moving target from a moving background.

26 Claims, 24 Drawing Figures

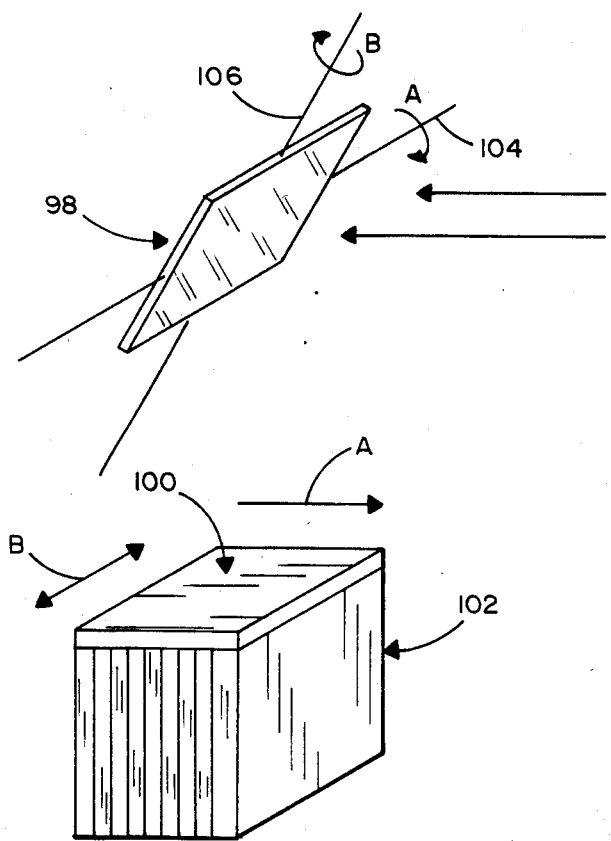
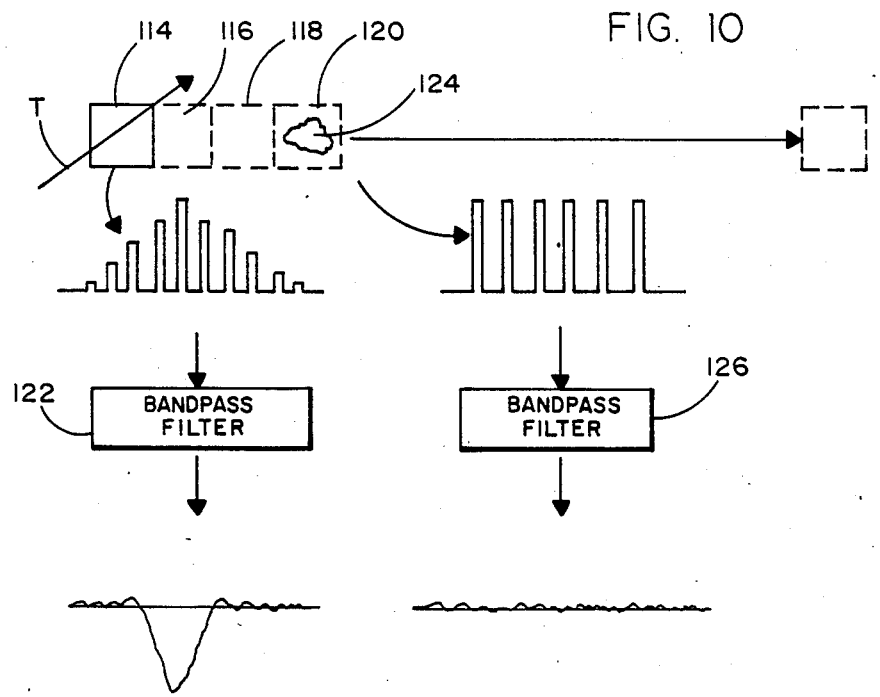
FIG. 8
FIG. 10

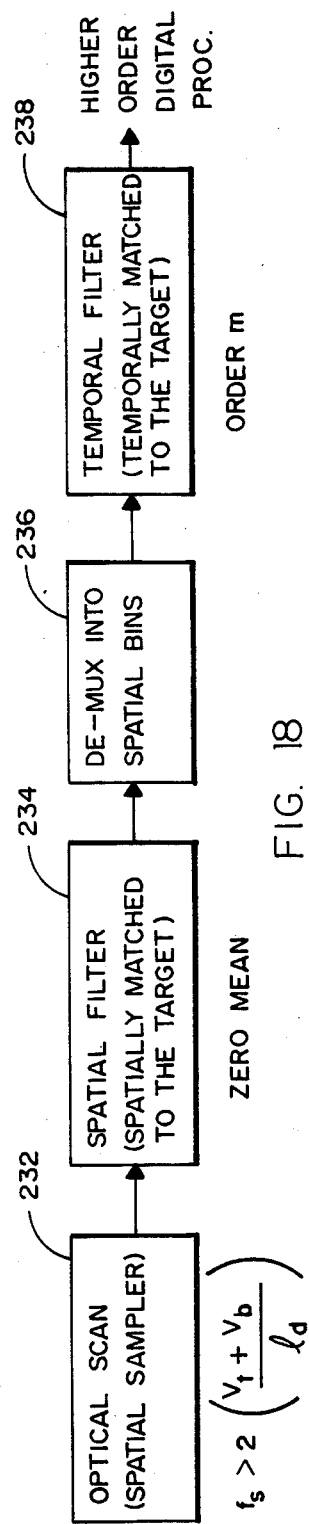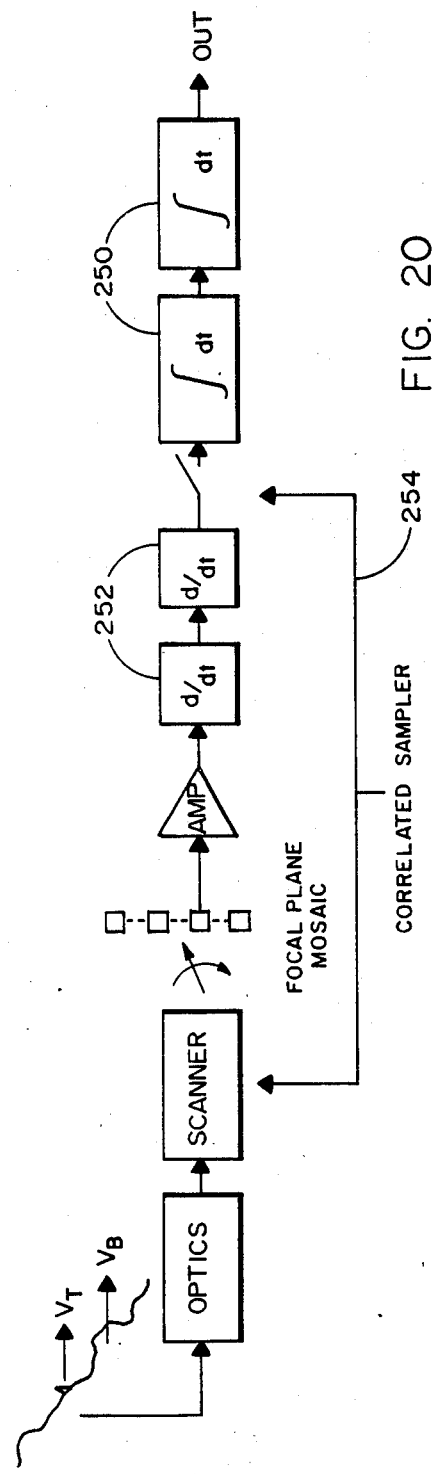
FIG. 18
FIG. 20

COMBINED STARING AND SCANNING PHOTODETECTOR SENSING SYSTEM HAVING BOTH TEMPORAL AND SPATIAL FILTERING

BACKGROUND OF THE INVENTION

This invention relates to detector arrays usable for optical imaging and surveillance purposes. It constitutes a "breakthrough" in this art because it succeeds in combining the benefits of a staring sensor array with the benefits of a scanning sensor array. And, additionally, it provides benefits which neither staring nor scanning arrays have accomplished. A staring array is usually a two-dimensional focal plane mosaic of photodetectors each of which continually "sees" a given pixel, i.e., an area of observation representing one unit of resolution. A scanning array is usually a line array of photodetectors, which are moved back and forth across a row, or column, of pixels.

In comparing scanner and starer capabilities, those possessed by one, but not by the other, may be treated as benefits of one or as deficiencies of the other. The following is a list of the primary scanner "deficiencies" in this context:

(1) Clutter limited performance;
(2) Mechanical complexity;
(3) Large transient pulses (when compared to true signals) from ionizing radiation;
(4) Difficult detector requirements;
(5) Large optics;
(6) Complex signal processor.

The following is a list of the primary starer "deficiencies" in this context:

(1) High detector count and operability requirements;
(2) Difficulty of multi-color operation;
(3) 1/f noise;
(4) Line of sight jitter and drift;
(5) Radiometric accuracy.

Three major additional deficiencies which are dealt with by the present invention, but not by either scanner or starer systems, are: (1) susceptibility to an overriding signal; (2) detector and electronics outage; and (3) discrimination between target and background regardless of their relative motion or intensity.

In a broad sense, the present invention deals with the problem of distinguishing a specific element, or "target", in the viewed scene, from its background. One type of difficulty exists when the background is essentially stationary, but the target is moving. The stationary background might, for example, be a cloud. Another, very different type of difficulty exists when the "target" appears to be essentially stationary, but the background appears to be moving. This situation may occur where the detector system is onboard a moving vehicle, and the target is coming directly toward the vehicle. Or, a further possibility exists where neither the detector nor the target appears to be moving, but the distance between them is changing.

The assignee of the present application has worked in both the starer and scanner fields, but primarily in the former. A plurality of prior applications, also assigned to the assignee of this application, relate to this general field of development.

Some of those applications deal with detector-supporting structures, and others deal with detector-connected circuitry. For example, U.S. Ser. No. 572,802, filed Jan. 23, 1984 as a continuation of U.S. Ser. No. 187,787, relates to a "focal plane" structure having a multiplicity of stacked semiconductor chips, which extend in planes perpendicular to the focal plane, and which carry circuits providing detector-contacting electrical leads at the focal plane. Each detector may (as shown in that application, and also in U.S. Pat. No. 4,490,626, issued Dec. 25, 1984, and in U.S. Ser. No. 558,099, filed Dec. 5, 1983) send its individual signal through a separate circuit comprising a pre-amplifier and a bandpass filter; and a multiplexer may combine the pre-processed signals from a number of such detector circuits. All of this circuitry for a multiplicity of detectors may be located on a single chip; and the stacked chips may provide circuitry for a dense array of detectors.

The present invention might be used with the stacked chip technology; or it might be used with other types of focal plane staring detector arrays.

It is well known that staring two-dimensional detector arrays have a major sensitivity advantage over scanning linear arrays. Another advantage of staring arrays is their ability to ignore non-moving, or slow-moving, objects, such as clouds. Because of the staring, the detector is "aware" that no significant change has occurred, i.e., background objects do not have the potentiality of "confusing" the array. On the other hand, since a scanning array creates its own motion, a non-moving object is "perceived" by a scanner as a signal change. The electronics must process this information, in order to determine that the object is not moving.

But any sensing system having an extremely large number of staring detectors is susceptible to certain problems. One significant problem is the extreme difficulty of obtaining adequate performance from every detector. Another significant problem, in space applications, is the potential effect of gamma rays in causing over-stimulation of any detectors they affect. A third problem is the difficulty of reducing pixel size, because of the mechanical limitations on the closeness of detectors to one another, a problem which is more difficult to solve in a two dimensional array than in a line array. And finally, a staring array provides no solution to the difficulty of separating a target which appears to be stationary from a background which appears to be moving.

SUMMARY OF THE INVENTION

The present invention, which has been dubbed the "dynamic staring" concept, makes it possible to combine the major advantages of staring and scanning sensor apparatus, and also to deal with all types of target vs. background discrimination problems.

One aspect of this invention is the use of each detector in a two-dimensional array for viewing a multiplicity of pixels and/or wave bands on a time-sharing basis. A simple scanning mechanism is combined with the two-dimensional array. The radiation data from each pixel viewed by a given detector is, in effect, "staring" data, because a separate filter dedicated to each pixel has an "integrating" effect on the data. In other words, each detector sends data to a multiplicity of filters; and each filter receives data at spaced intervals from the same pixel, and from only that pixel.

The filter is particularly appropriate for this system because its "resistance" values are derived from switched capacitance circuitry, whose "on" periods are synchronized to link a particular pixel to a particular filter. The output of all the filters is fed into a multiplexing circuit. It is desirable, but not mandatory, that the multiple filters and multiplexer circuitry all be located at the focal plane, i.e., on circuit carrying stacked layers which terminate at the focal plane.

The number of pixels and/or wave bands which can be "seen" by each detector is limited only by the time-sharing aspects of the system. This flexibility in the ratio of pixels to detectors can be used to obtain various highly desirable benefits, either separately or in various combinations. A benefit of major importance is detector redundancy, i.e., the ability of more than one detector to view the same pixel, thereby permitting the electronics to correct for errors of individual detectors. Another significant benefit is the ability to increase the resolution, by providing more pixels than detectors, without losing the "staring" quality of each pixel. Furthermore, the multiplicity of filters associated with each detector may also be used to provide multi-color data from each pixel.

Another important aspect of the present invention is the combination of the multiple bandpass filter array of each detector, i.e., the parallel filter array, with a single high frequency filter in series between the preamplifier and the parallel filter array. In this circuitry, the initial, high frequency filter acts as a spatial filter; whereas each of the subsequent parallel filters acts as a temporal filter. This is a unique arrangement, which will prevent the scattered radiation due to a bright, pulsing object from blocking the dynamic starer, because, if the radiation is spatially correlated, it won't get through the first filter circuitry, and if it is temporally correlated, it won't get through the second filter circuitry.

This spatial filter/temporal filter combination provides for essentially unlimited target discrimination possibilities. The signals generated by the scanning motion pass through the spatial filter associated with each detector, and function as "edge detectors" in distinguishing targets from the background. Because both the spatial filter and the temporal filters incorporate switched capacitor resistance-equivalents, both spatial and temporal filters are tunable. This tunability of both spatial and temporal filters, accomplished by varying the switching frequency in the switched capacitor circuitry, permits the filters to be adjusted to obtain maximum target vs. background discrimination.

BRIEF DESCRIPTIONS OF THE DRAWINGS

FIG. 1, which is similar to FIG. 6 of U.S. Ser. No. 721,040, shows diagrammatically the preferred focal plane circuitry of each independent photodetector;

Figure 2:
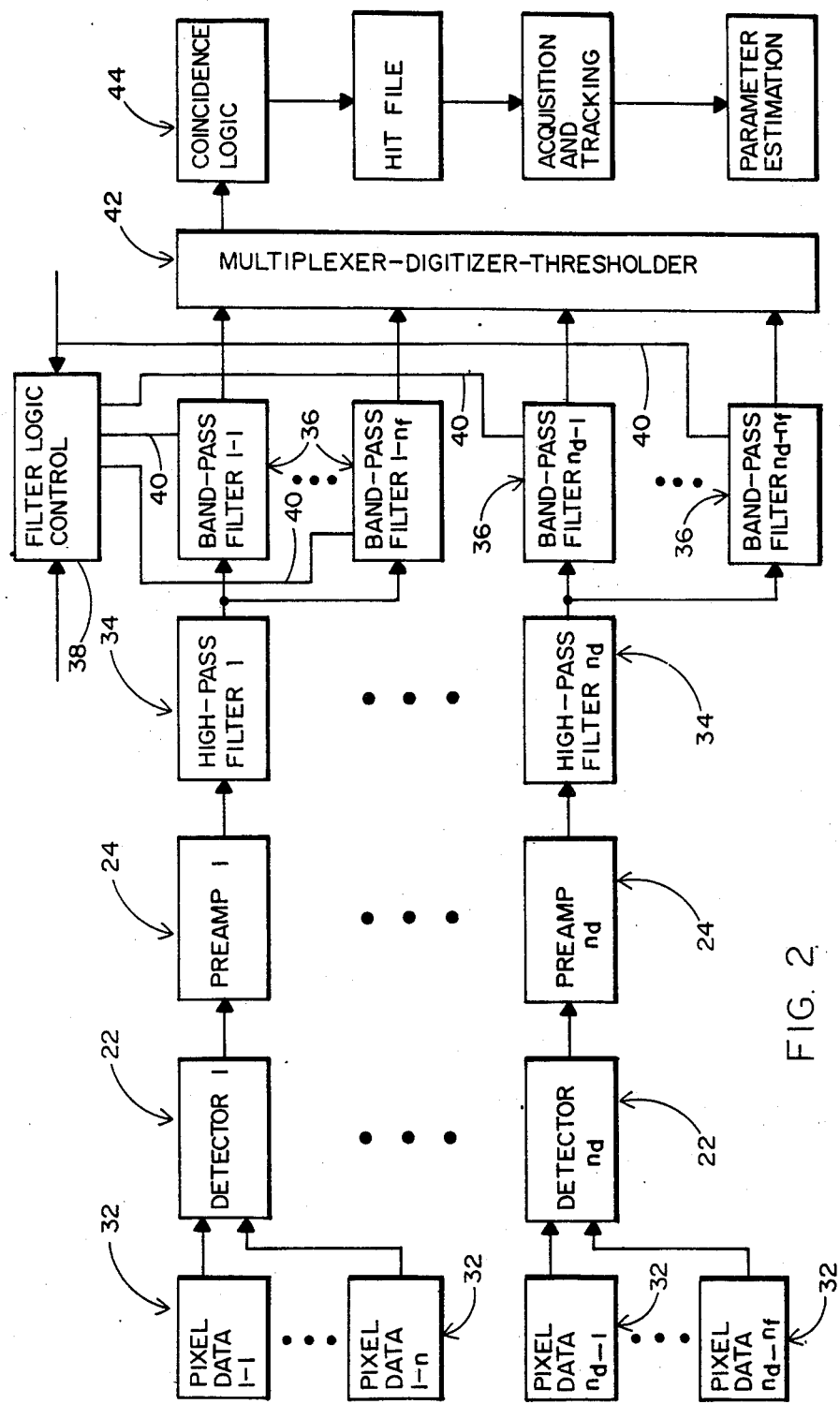
FIG. 2 shows diagrammatically the photodetector-connected electronic circuitry of the present invention.
Figure 9:
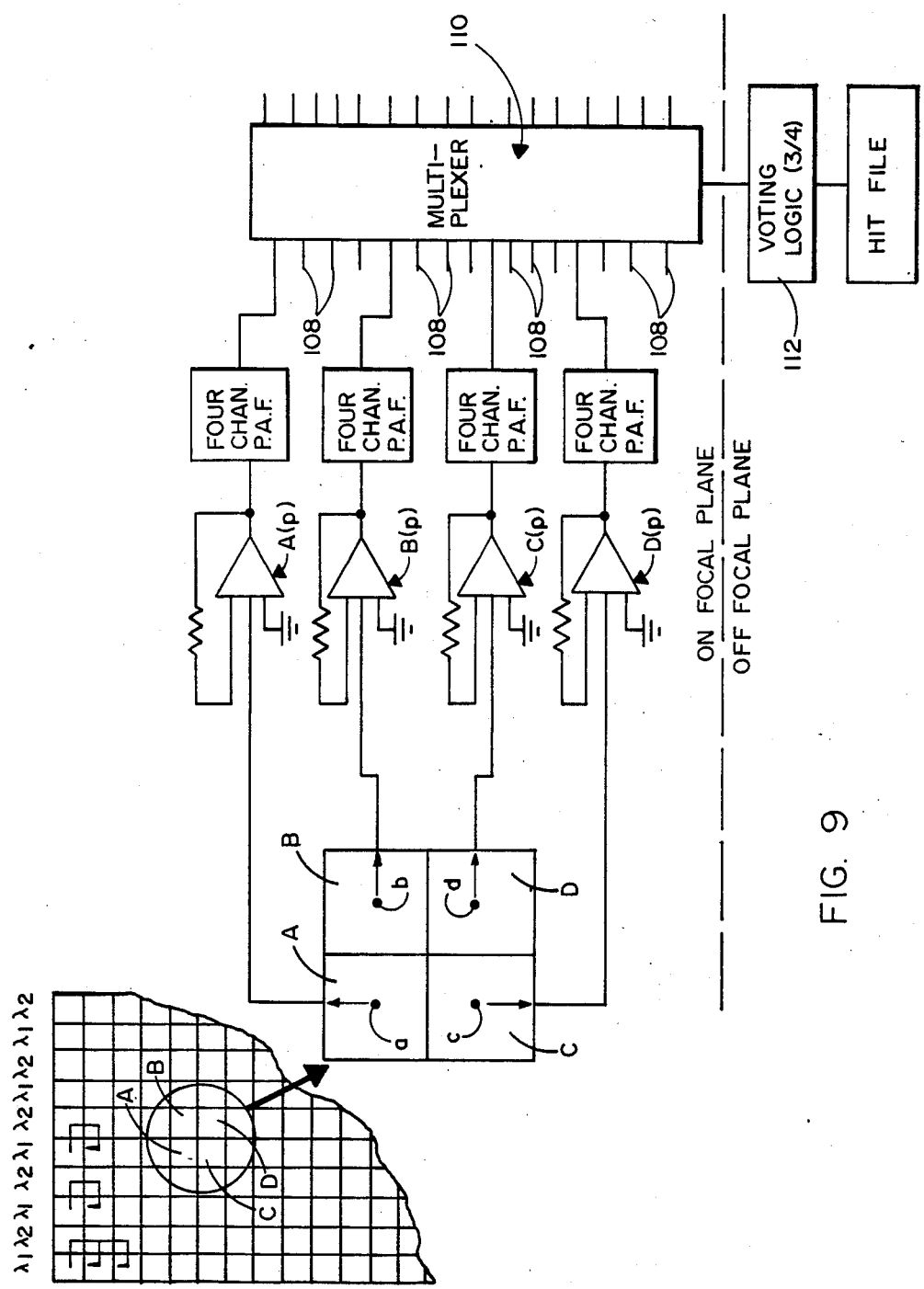
Figure 11:
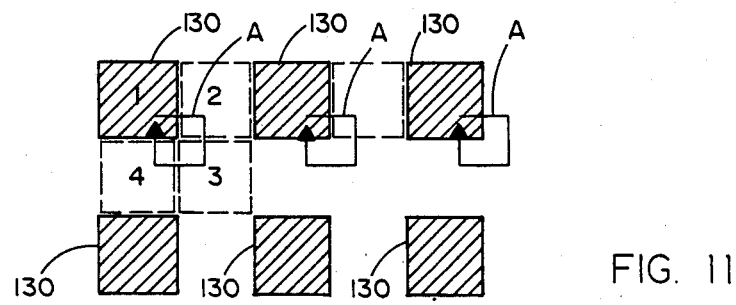
Figure 12:
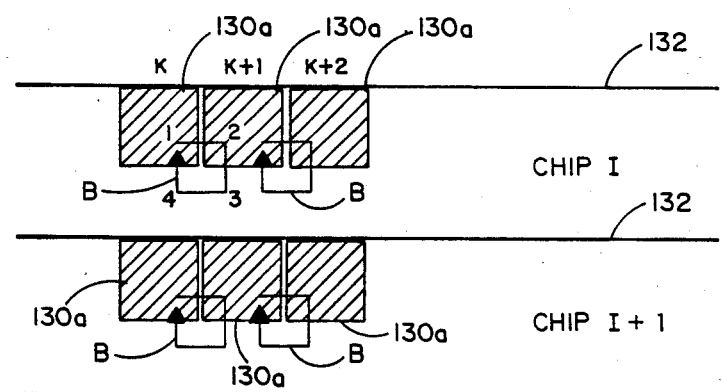
Figure 17:
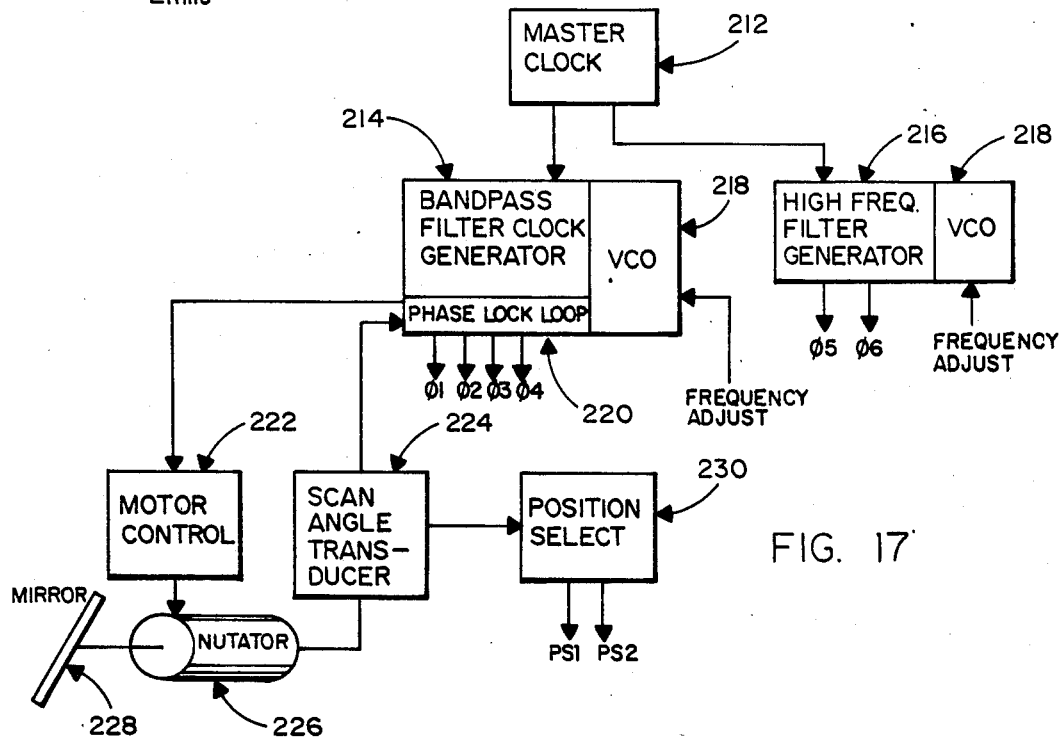
Figure 16A:
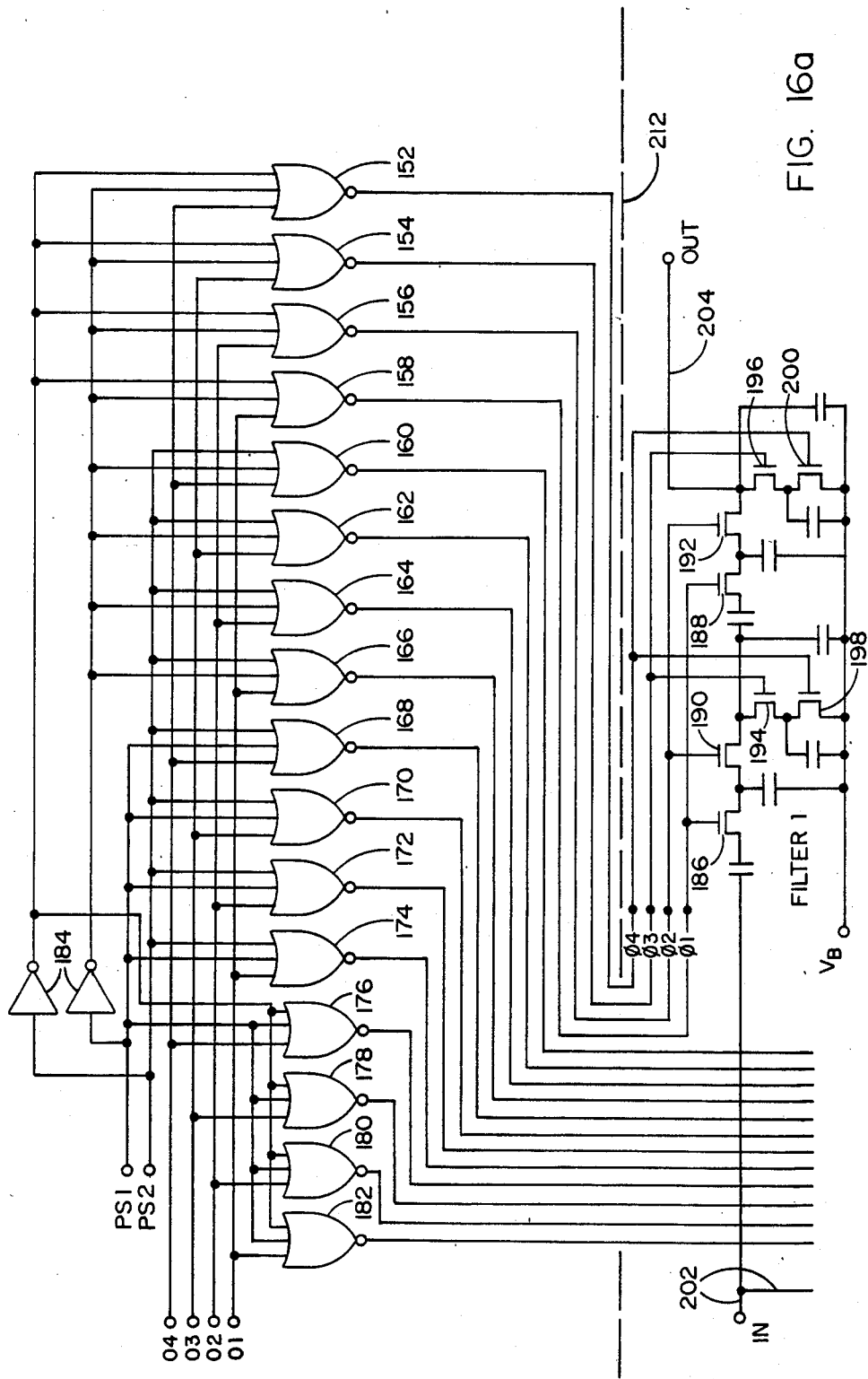
Figure 16B:
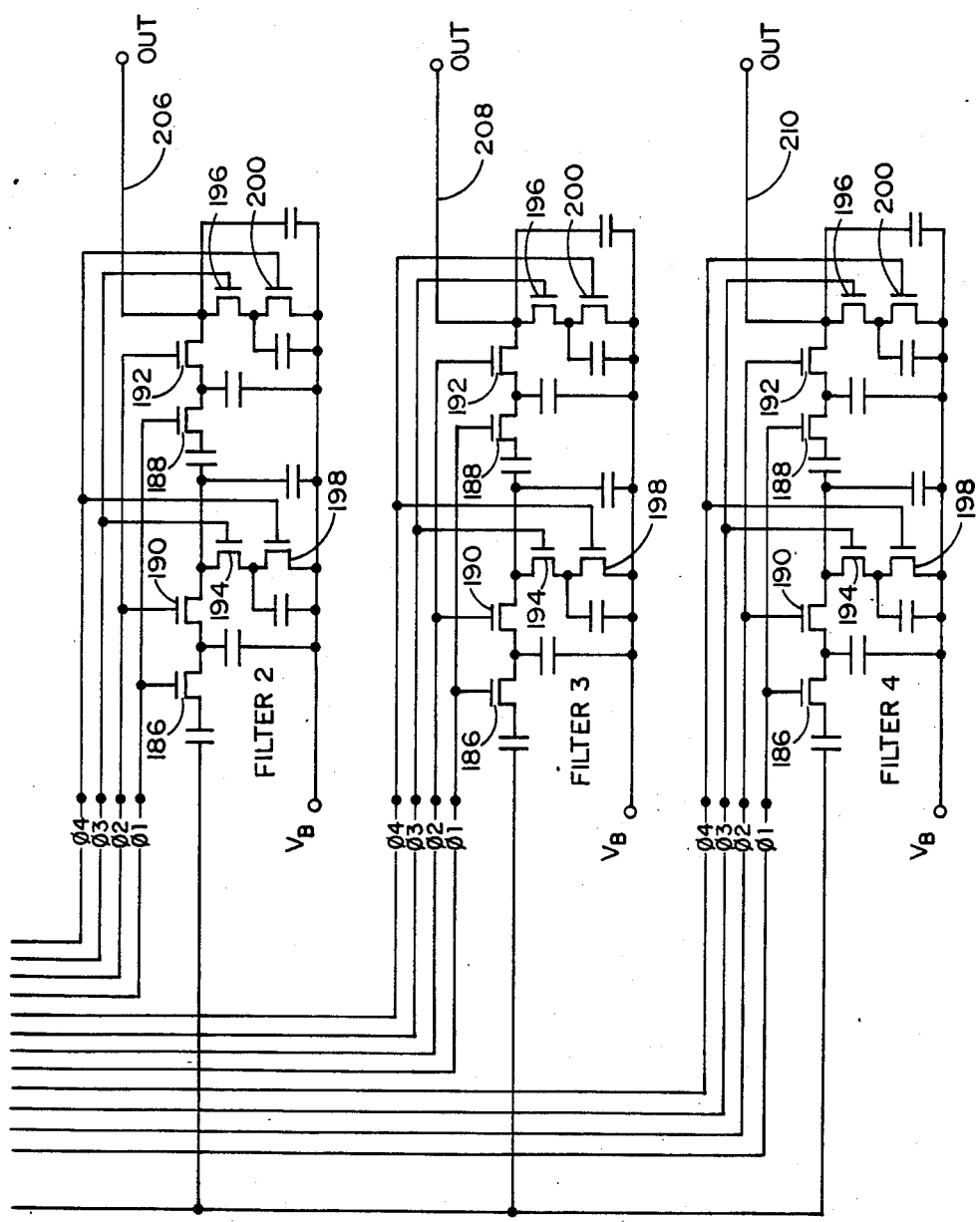
Figure 19:
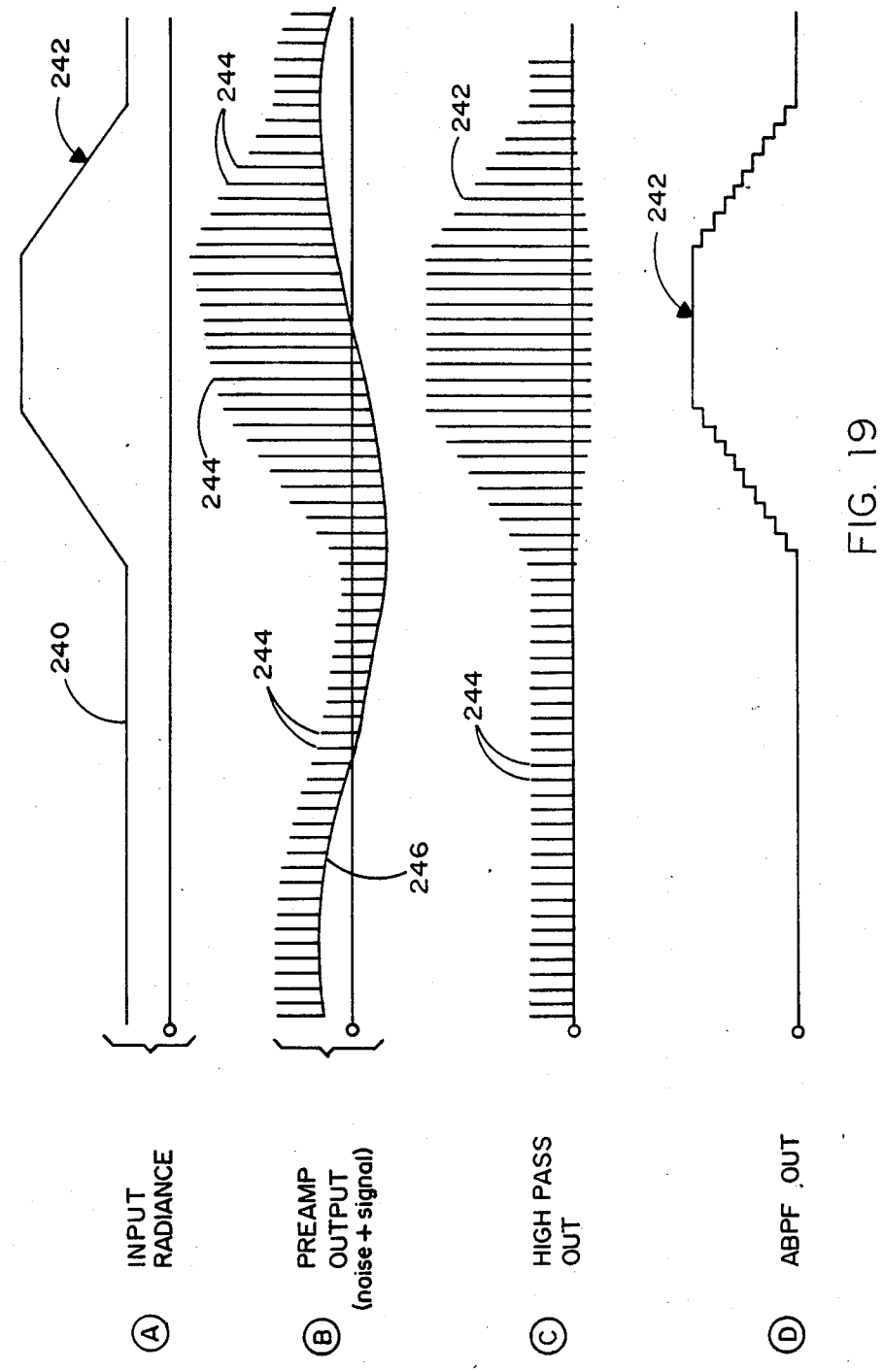
Figure 21:
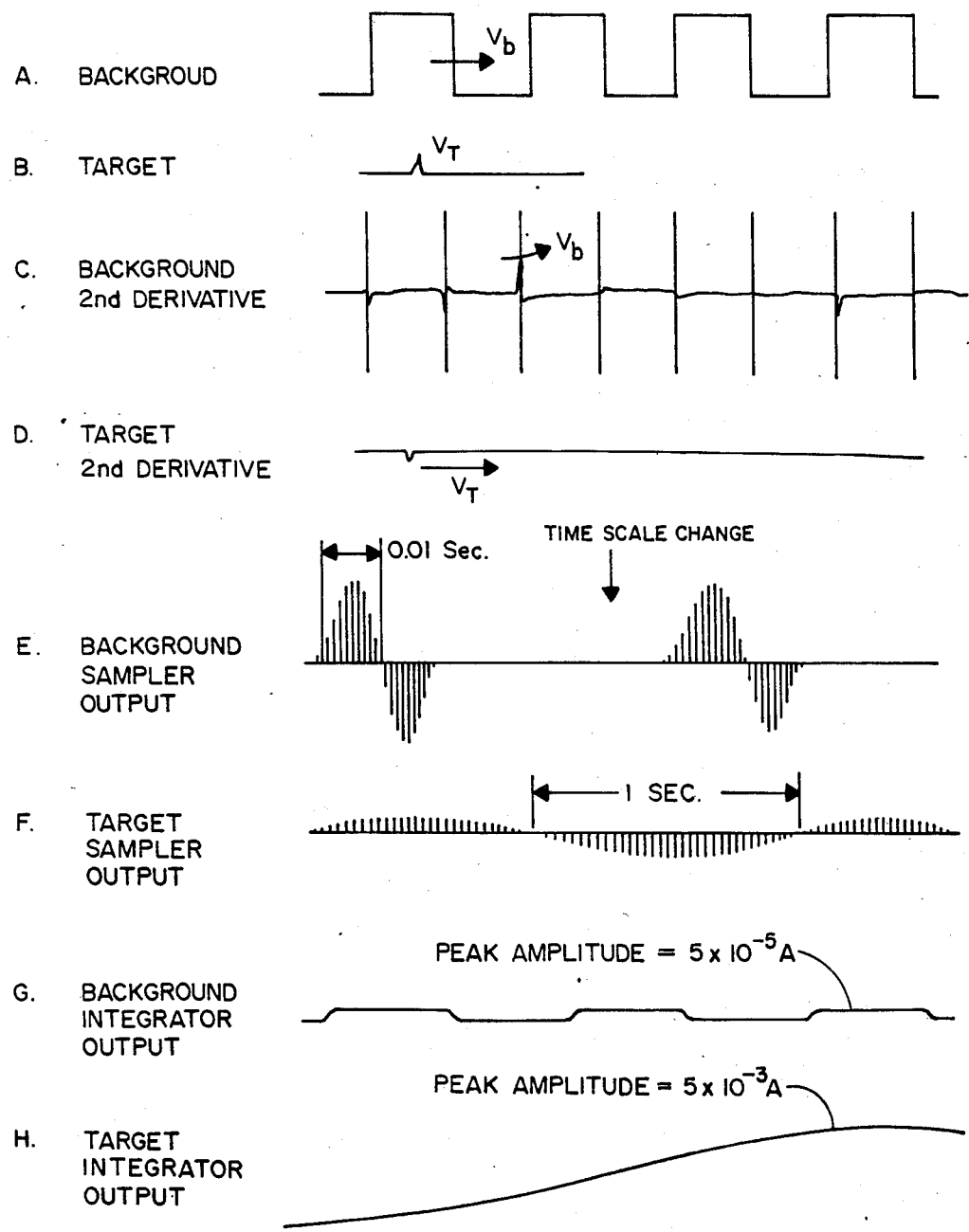
Figure 22:
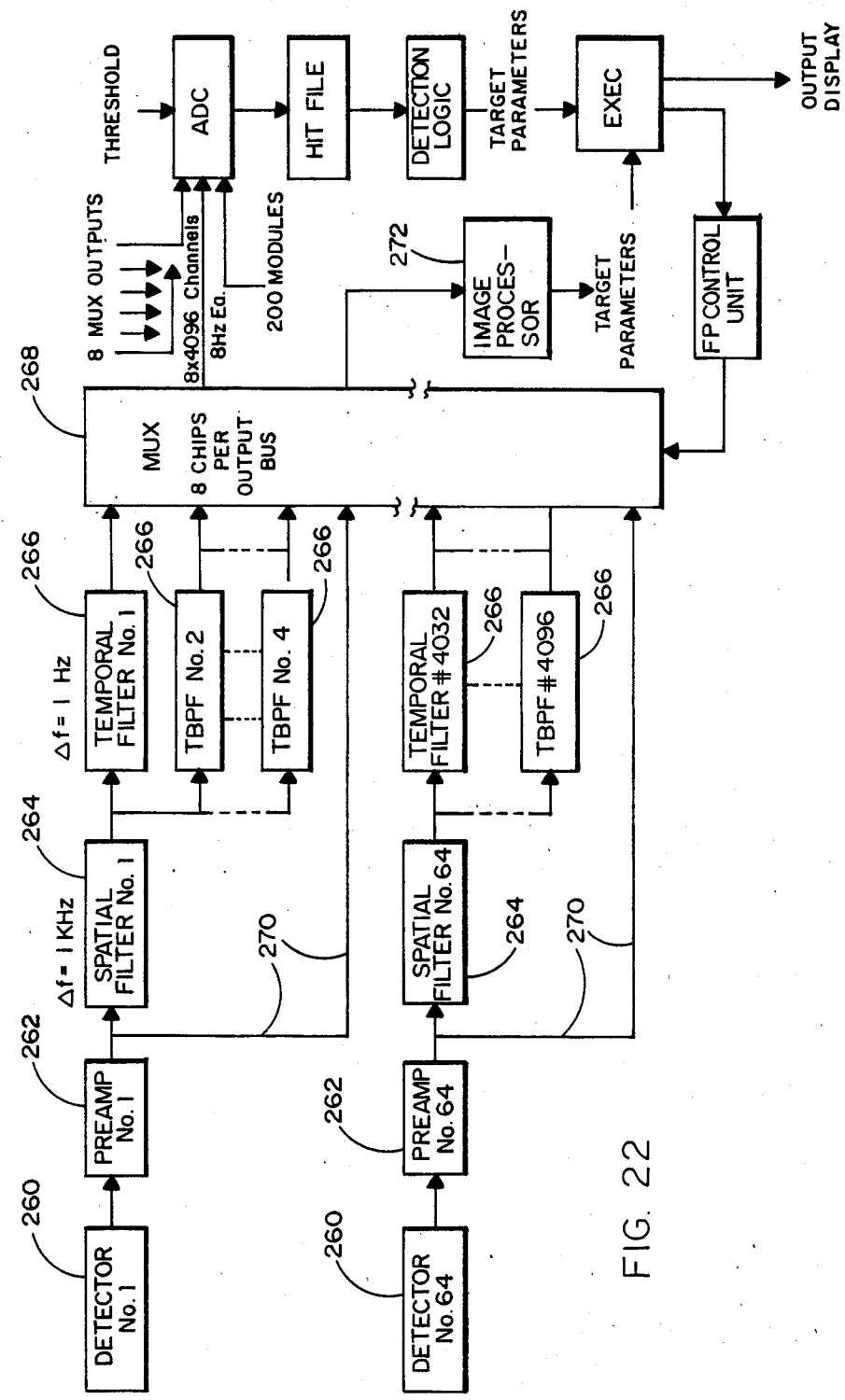

FIGS. 5-8 each show a sketch of a different type of scanning system which might be used in combination with a two-dimensional photodetector array;

FIG. 9 shows diagrammatically a combined staring/scanning system used solely to improve redundancy, thereby compensating for deficiencies of individual detectors;

FIG. 10 illustrates the value of a temporal filter in distinguishing a moving target from an essentially stationary background;

FIGS. 11, 12, 13(a–b), 14, show diagrammatically several possible uses of dynamic staring, e.g., redundancy, improved resolution, pixel overlap, multi-color, and combinations thereof;

FIGS. 16 (a–b) shows an electronic control logic system for a parallel bandpass filter group;

FIG. 17 shows an electronic clocking system which provides clock signals to the transistor switches in the filters of FIG. 16;

FIG. 18 diagrams, in summary form, the spatial filter, temporal filter relationship, and the frequency determination factors in a dynamic stare system;

FIG. 19 is a signal waveform diagram showing the progression of a signal through the spatial and temporal filters;

FIGS. 20 and 21 show the application of the present invention to an IRST system, FIG. 20 representing the target/background relationships, and FIG. 21 providing a signal waveform diagram; and FIG. 22 shows diagrammatically a modified version of the system of FIG. 2.

DETAILED DESCRIPTION OF SPECIFIC EMBODIMENTS

Figure 1:
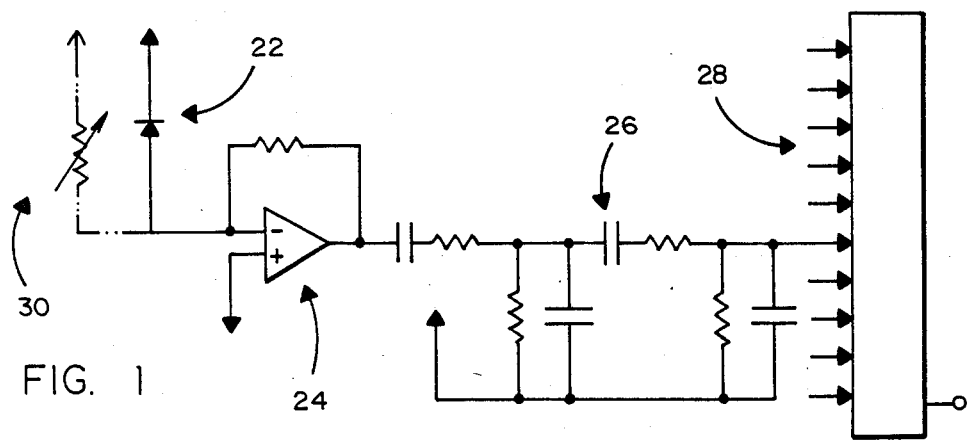
Figure 6:
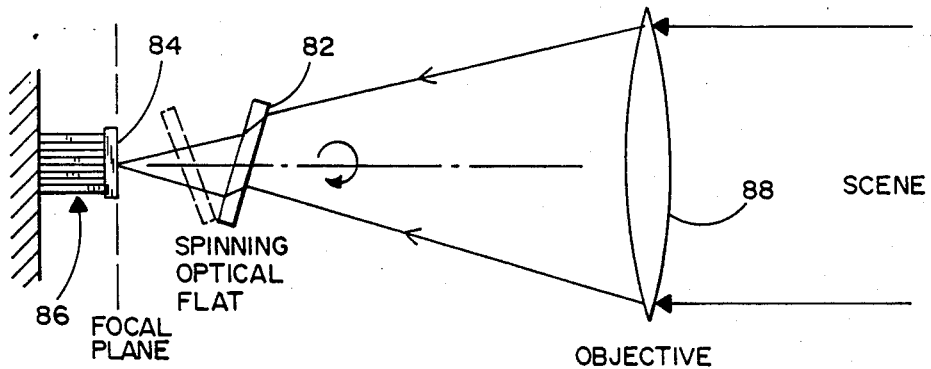

FIG. 1, which is similar to FIG. 6 of U.S. Ser. No. 721,040, shows focal plane circuitry of a single photodetector, which incorporates the basic electronic components beginning with the detector and extending through the on-focal-plane multiplexer. Each detector 22 has its output connected to a preamplifier 24. Each preamplifier feeds its output signal to an individual adaptive bandpass filter 26, which selects the desired band of frequencies to be processed. The post-filter signal is input to a multiplexer 28, which comprises parallel input branches from each of the separate detector circuits, and a control circuit which causes sequencing of the multiplexed output signals conducted off the chip.

The preamplifier 24 may be similar to that disclosed and claimed in common assignee U.S. Pat. No. 4,555,623, issued Nov. 26, 1985 on application Ser. No. 558,099, filed Dec. 5, 1983; and the multiplexer 28 may be similar to that disclosed and claimed in common assignee U.S. Pat. No. 4,490,626, issued Dec. 25, 1984 on application Ser. No. 403,004, filed July 29, 1982. The circuit of FIG. 1 is designed for the use of photo-voltaic detectors. If photo-conductive detectors are used, an exterior current source 30 (shown in phantom) is included.

Each photodetector 22 is one of many such detectors included in a two-dimensional array; and separate signals are processed by each detector. The array consitutes a "staring" array, unless scanning means are interposed between the two-dimensional array and the viewed scene. In the present invention such scanning means are combined with the two-dimensional array.

In U.S. Ser. No. 721,040, a limited amount of scanning, or "nutation", is combined with a two-dimensional detector array, in order to provide signal redundancy and/or better resolution. Signal redundancy involves the use of a plurality of detectors to view the same pixel, thereby compensating for problems due to inadequacy of individual detectors. Better resolution is obtained by having a single detector view a plurality of pixels, thereby permitting the resolution to be partially freed from the mechanical limitations of building discrete detectors extremely close to one another.

In U.S. Ser. No. 721,040, the advantages obtained by limited scanning of a two-dimensional array are obtained by at least partially sacrificing the benefits of "staring" sensors (temporal filtering).

The present invention eliminates that trade-off problem by utilizing a plurality of parallel bandpass filters between each detector and the multiplexer. The filters associated with each detector are switched on and off, so that the detector output is "time-shared" by a plurality of separate output signals.

By synchronizing each bandpass filter with a single input radiation source entering the detector, such as a separate pixel, the staring benefit (temporal filtering) is retained, because each filter continues to "view" the same input source. The bandpass filters incorporate capacitors which store, and therefore integrate, the repetitive synchronized inputs from the pixel at which the particular filter is "staring".

The general system is shown diagrammatically in FIG. 2. Two detectors are shown, each indicated by the numeral 22. One is designated "Detector 1", and the other is designated "Detector n(d)", indicating that any desired number (n) of detectors can be connected in parallel in the circuitry. The output of each detector is input to its own preamp 24.

Each detector 22 has a plurality of inputs, or signal sources, 32, two of which are shown. One is designated "Pixel data 1—1" and the other is designated "Pixel data 1—n", indicating that a plurality (n) of such signal sources are providing inputs to a single detector. (The value of "n" for the number of detectors is not related to the value of "n" for the number of separate inputs to each detector).

Each preamp 24 directs its output to a series filter 34, the number of which equals the number of detectors. The filter 34 acts as a "spatial" filter, which passes relatively high frequency signals.

From each spatial filter 34, a plurality of parallel output leads provide inputs to a plurality of parallel bandpass filters 36. Each filter 36 acts as a "temporal" filter, which passes signals having much lower frequencies than those passed by the spatial filter 34. One spatial filter 34 is shown connected to two parallel temporal filters 36 which are designated "Band-pass filter 1—1" and "Band-pass filter 1—n(f)", respectively. Another spatial filter 34 is also shown connected to two parallel temporal filters 36 which are designated "Band-pass filter n(d)—1" and "Band-pass filter n(d)—n(f)", respectively.

The term "spatial filter" is used to signify that the electronic signals which are passed through each filter 34 are caused by different radiation inputs across space, i.e., inputs which provide signal pulses as a result of radiation variations between different locations in the field of view. The scanning process, in effect, converts spatial variations into timed signals which enter each filter 34.

The term "temporal filter" is used to signify that the electronic signals which are passed through each of the parallel filters 36 are caused by different radiation inputs across time, i.e., inputs which provide signal pulses as a result of radiation variations caused by the elapsing of time. This is the normal property of staring sensors, which are provided in the present invention by the integrating properties of the individual filters 36, each of which is caused by synchronization to receive input only from its assigned pixel, or color.

The particular nature of the spatial filter/temporal filter interface will be discussed in detail below.

The concept that each temporal filter 36 is "dedicated" to a particular pixel 32 is a fundamental aspect of "dynamic staring". Filter logic control circuitry is indicated diagrammatically at 38. It has separate electrical leads 40 to each temporal filter 36. A clocking system is used to cause each temporal filter 36 to receive input signals from its detector 22 only during a fraction $[1/n(f)]$ of the time. In other words, each detector is "time-shared" by a plurality of parallel filters; and each such filter is "on" for a percentage of the total time inversely proportional to the number of such filters connected to a given detector.

The scanning operation will cause a plurality of input signals from separate sources (pixels) to "time-share" a given detector. Synchronization under clock control will cause each parallel filter 36 to "view" the same input signal source at all times, thereby permitting a particular filter to "stare" at a particular source.

It is assumed that the number of parallel filters which time-share each detector will generally be equal to the number of input signals which time-share that detector. It is conceivable, however, that, in situations involving redundancy, i.e., a plurality of detectors "viewing" the same pixel in order to assure acceptable detector performance, more than one pixel signal might be directed to a particular temporal filter.

The definition of separate "viewed" input signals not only includes separate pixel areas, but can include separate wave band (color) samplings from a single pixel.

Each temporal filter 36 (FIG. 2) outputs to a multiplexer 42, whose output is shown leading to coincidence logic 44, from which output information is shown going to a series of further electronic data manipulation circuits.

Figure 3:
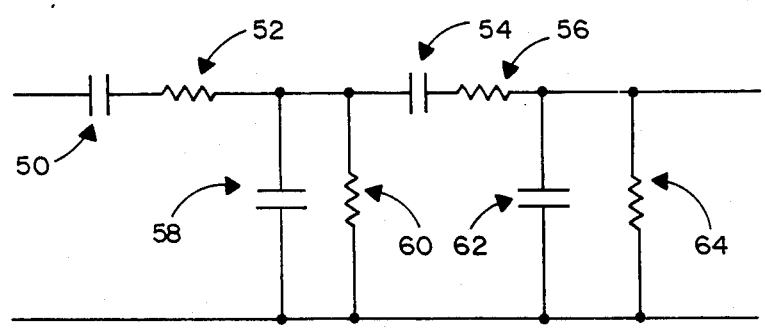
FIG. 3 shows an "equivalent" switched capacitance circuit for a bandpass filter, in which resistance symbols are used.
Figure 4:
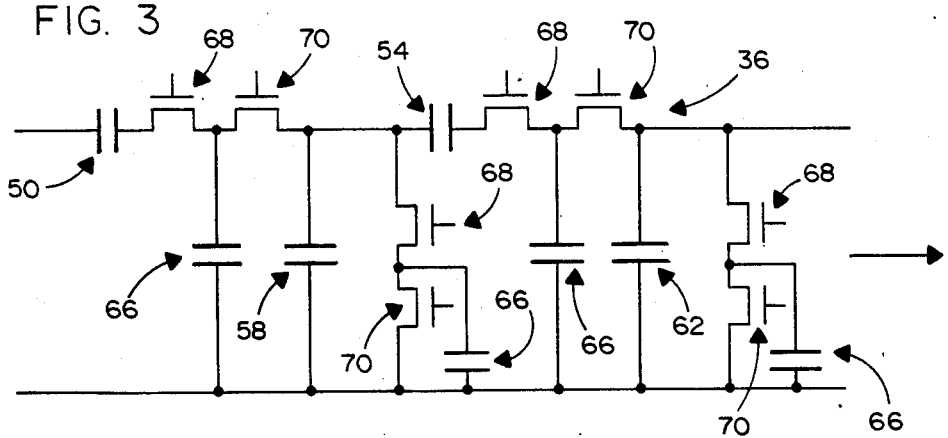
FIG. 4 shows an actual bandpass filter circuit which replaces each resistor in FIG. 3 with a switched capacitance network.

FIGS. 3 and 4 show details of an individual filter 36 (also shown at 26 in FIG. 1). The resistances in the filter are provided by switched capacitance networks. Such networks not only are preferred for use in integrated circuits, particularly those incorporating MOSFET transistors, but also are vital for the attainment of the combined staring/scanning benefits, and the tunability, of the present invention.

FIG. 3 shows an equivalent bandpass filter circuit, in which resistance symbols are used. The values shown are illustrative of an operating system having a clocking frequency of 100 Hz. In order to obtain efficient filter performance, i.e., sharp roll off, the band-pass filter in FIG. 3 is a four pole filter incorporating, in effect, two high pass and two low-pass filters. In other words, the filter is a second order filter. Higher order filters may be used to obtain even better performance. The first high-pass filter comprises capacitor 50 and resistance 52; the second high-pass filter comprises capacitor 54 and resistance 56. The first low-pass filter comprises capacitor 58 and resistance 60; the second low-pass filter comprises capacitor 62 and resistance 64.

FIG. 4 shows the actual circuitry of a single bandpass filter 36, in which switched capacitance networks provide resistance equivalents. Each of the four resistors of FIG. 3—52, 56, 60 and 64—, is replaced by a switched capacitance network, which has a capacitor and two switching transistors. The capacitor in each switched capacitance network is indicated by numeral 66. The charge on each capacitor 66 is controlled by two transistor switches 68 and 70. The switches used are preferably MOSFET transistors. A clocking control system alternately opens and closes each pair of switches 68 and 70. In other words, each switch 68 closes as its paired switch 70 opens, and opens as its paired switch closes. The equivalent resistance developed by each switched capacitance network is a function of the frequency of the on-off switching signals, based on the equation: $R = 1/fc$.

The respective gates of MOSFETs 68 and 70 receive signals, at the clock established frequency, which alternately cause current flow and current cut-off between their source and drain connections. When source-to-drain current flows in switch 68 (but not in switch 70), capacitor 66 tends to charge. When source-to-drain current flows in switch 70 (but not in switch 68), capacitor 66 tends to discharge. The high and low voltages reached by each capacitor 66, together with the switching frequency, provide very accurate resistance equivalents in each bandpass filter.

The values existing in each switched capacitance network are, in effect, "frozen", during the period when a particular band-pass filter is not sending its output to the multiplexer, i.e., the period when the other parallel bandpass filters are being "sampled", under control of the filter logic control 38. During the off period of each filter, its switches 68 and 70 are both open, and the charge on capacitors 50, 54, 58 and 62 remains substantially unchanged.

The number of parallel band-pass filters associated with a given detector can be varied to fit the needs of the system, its electronic limitations, and its real estate limitations. Numbers of such parallel filters from four to sixty-four have been considered for various combinations of benefits. When the scanning returns to a given pixel, the band-pass filter "dedicated" to that pixel will again be operative. And it will, in effect, integrate successive signals from the pixel in such a way that a "staring" effect is obtained. Obviously, there is a sacrifice of sensitivity when the staring time of a given pixel is reduced. But the system can be designed to provide overall benefits which are extremely valuable.

Any suitable scanning mechanism may be used. Pages 206 to 209 of Infrared Systems Engineering by Richard Hudson discuss methods of generating scan patterns. Either mechanical or optical means can be used to generate the scan pattern. The text discusses scanning along a linear path, a rosette path, a circular path, and a spiral path. It shows, as possible scanning devices, the use of a pivoted mirror, a rotating sphere carrying optical elements, or rotating wedge-shaped prisms. Another scanning method is "dithering" of the focal plane itself.

In U.S. Ser. No. 721,040, three scanning methods are shown. In FIG. 1 of that application, which depicts a prior art system, a linear scan is accomplished by a mirror having limited movement about a central axis. In FIGS. 11 and 13 of that application, mechanisms are shown which scan by non-linear motion, FIG. 11 moving a reflecting surface for scanning purposes, and FIG. 13 moving a refractive prism for scanning purposes. The non-linear scanning motion is sometimes referred to as "nutation"; and a back-and-forth excursion is sometimes referred to as "dithering".

Although U.S. Ser. No. 721,040 indicated a preference for a plurality of "fixed positions" of the scan, for the purpose of the present invention it is preferable, and much easier, to use a continuous scanning motion.

Figure 5:
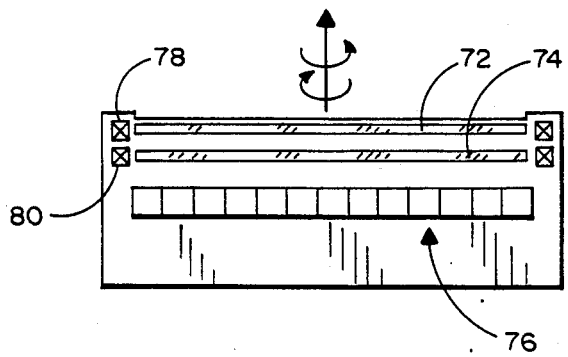

FIGS. 5-8 show different embodiments of a possible scanning system which could be used with the staring two-dimensional photodetector array. FIG. 5 shows two counter-rotating prisms 72 and 74 located adjacent a two-dimensional photodetector array 76. The prisms 72 and 74, each of which has a slight diametrical wedge angle, are supported peripherally by bearings 78 and 80, respectively.

FIG. 6 shows a spinning optical flat 82 adjacent a two-dimensional photodetector focal plane 84 provided by a stacked chip module 86. An optical focusing element 88 is between the viewed scene and the flat 82.

Figure 7:
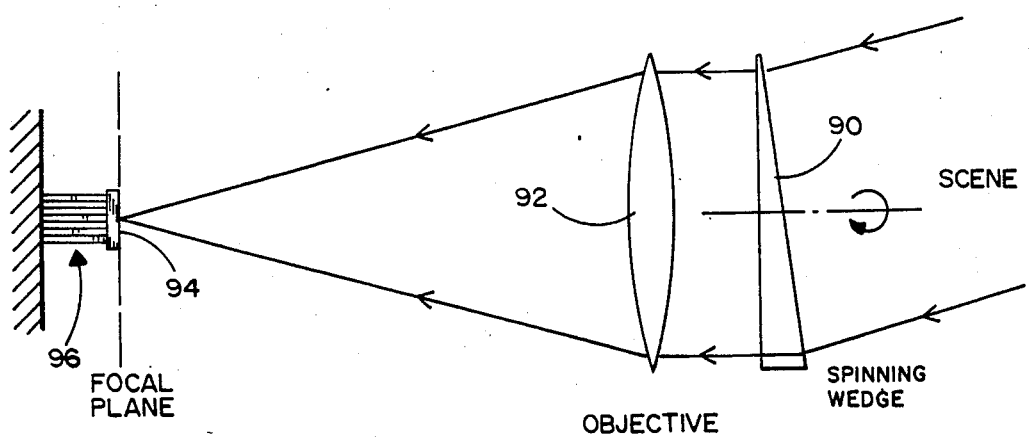

FIG. 7 shows a spinning wedge 90 between the viewed scene and an optical focusing element 92. The radiation is focused on a photodetector focal plane 94, also provided by a stacked chip module 96.

FIG. 8 shows a scanning mirror 98 which may have limited rotation around two perpendicular axes to scan the viewed scene, and thereby vary the pixels viewed by the photodetectors. As in the previous figures, a two-dimensional array of photodetectors is provided on the focal plane 100 of a stacked chip module 102. The scanning is linear. Arrow A indicates a relatively extensive linear scan caused by motion of mirror 98 around axis 104. Arrow B indicates a relatively limited, or "dithering", linear scan caused by motion of mirror 98 around axis 106.

As stated above, three major benefits which can be obtained from the present "dynamic staring" system are: (1) redundancy to tolerate detector defects; (2) finer resolution than that provided by a given number of detectors in a two dimensional array; and (3) multi-color observation for improved identification of objects. Although these benefits can easily be combined, clarity of the description will be served by initially isolating some of the potential benefits.

FIG. 9 shows one of the first variations considered, which is devoted solely to the benefit of redundancy. One of the significant problems with photodetector arrays is the problem of individual non-functioning detectors, i.e., "outages". A very satisfactory sensing system, using currently available technology, can be provided using the redundancy feature. In FIG. 9, four detectors each view four pixels; and each pixel is viewed by four detectors.

The left portion of the figure is a closeup of the focal plane, from which four detectors—designated A, B, C, and D—have been extracted for illustrative purposes. The four dots—designated a, b, c, and d—are used to indicate the respective centers of four viewed pixels.

Each of the four detectors has its own pre-amplifier A(p), B(p), C(p), and D(p). The output of each preamplifier is directed to a four channel phased array filter indicated by a box in the figure. Each box represents four parallel bandpass filters, as illustrated in FIG. 2. In other words, there are sixteen bandpass filters (four associated with each detector) in the system of FIG. 9, each filter having its own output line 108 leading to multiplexer 110.

The filter control logic 38 (FIG. 2) causes each bandpass filter to be functioning only one-fourth of the time; and the synchronization provided by the filter control logic matches each filter to the same pixel. Thus each filter is, in effect, staring at a given pixel. Because all four detectors, in turn, view the same pixel, there is four-fold redundancy of pixel viewing. The multiplexed output signals are directed to voting logic electronics 112, which uses any suitable selection, or averaging, system to correct for failures or abnormalities of individual detectors. For example, the voting logic might discard the detector signal which is farthest from the norm, and average the other three.

As stated above, detector abnormalities may be permanent, due to manufacturing defects, or temporary, due to such stimuli as gamma rays. Regardless of the reason for the problem, the redundancy feature compensates for it. Because each filter is dedicated to a given pixel, the benefits of staring are largely retained, in that non-moving background elements, such as clouds, are not able to send signals through the bandpass filter, whereas moving target elements are able to send signals through the filter.

This benefit of the staring, or temporal, filters is illustrated in FIG. 10, which shows a linear (horizontal) scan across four pixels, designated 114, 116, 118, and 120. The arrow T indicates a target moving across pixel 114, which sends a signal through bandpass filter 122. A cloud, designated 124, seen by pixel 120, does not send a signal through bandpass filter 126. The position and motion of the target in the viewed scene can, therefore, be observed.

FIGS. 11-15 show diagrammatically several individual and combined uses of dynamic staring.

FIG. 11 illustrates a 4-position dither pattern of scanning, in which the multiple pixel per detector system is used solely for resolution improvement. Each of the cross hatched elements 130 represents a photodetector which is one of the focal plane detectors in a two-dimensional array. Each detector 130 is caused to view four pixels. The four pixels viewed by the detector 130 at the upper left are designated by the numerals 1, 2, 3, and 4, through which an arrow-headed line is drawn to represent the four-pixel viewing sequence. As previously explained, each of the four pixels (1, 2, 3, and 4) has its own "dedicated" temporal filter 36 (FIG. 2).

Assuming the center-to-center spacing of detectors 130 in FIG. 11 is four mils, the center to-center spacing of the pixels (1, 2, 3, 4) will be 2 mils. Thus, the resolution in each direction has been improved by a factor of two. This arrangement allows lower detector and electronic density, thus permitting higher manufacturing yields.

FIG. 12 illustrates a 4-position dither pattern of scanning, in which the multiple pixel per detector system is used partially for resolution improvement, and partially for redundancy. Each of the cross-hatched elements 130a represents a photodetector which is one of the focal plane detectors in a two-dimensional array. The four pixels viewed by the detector 130a at the upper left are (as in FIG. 11) designated by the numerals 1, 2, 3, and 4, through which an arrow-headed line B is drawn to represent the four-pixel viewing sequence. Each of the four pixels has its own dedicated temporal filter 36.

In FIG. 12, two detectors view the same pixel, in order to provide redundancy, i.e., a means of comparing performance of detectors. The detector 130a at the upper left, in its pixel position 2, views the same pixel that the next detector (to its immediate right) views in its pixel position 1. This redundant viewing occurs along each horizontal line, or row, of detectors.

Pixel positions 3 and 4 are used to improve, by a factor of 2, the resolution along each vertical line, or column, of detectors. The horizontal lines 132 in FIG. 12 represent the interfacing planes of stacked chips. Because it is easier, in manufacturing, to reduce spacing between electrical leads along the surface of each chip (considered as X-axis spacing) than to reduce chip thickness (considered as Y axis spacing), the arrangement of FIG. 12 is designed to accommodate this distinction. If it is designed to provide pixels having two mil spacing, FIG. 12 accomplishes this by locating the detector centers two mils apart along the chip surfaces 132 (X-axis), while allowing four mil spacing between surfaces 132 (Y-axis).

The FIG. 12 arrangement, as compared to the FIG. 11 arrangement, has a factor of 2 improvement in signal-to-noise ratio, permits sudden individual detector failures to be handled automatically, and permits detector nonuniformities to be removed.

Figure 13A:
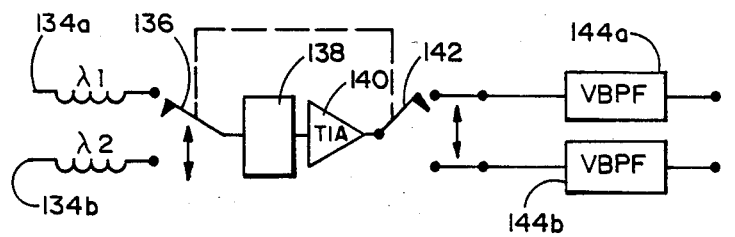
Figure 13B:
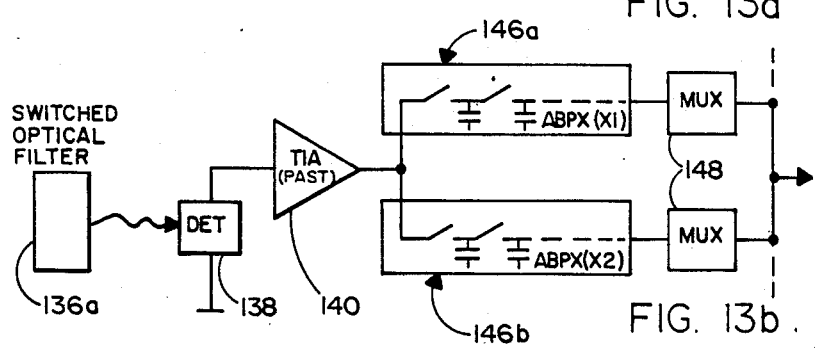

FIGS. 13A and 13B illustrate the usefulness of the present invention for providing multi-color data (i.e., a plurality of separate spectral wavebands), which can be highly valuable in target identification. In FIG. 13A, two incoming radiation wavebands 134a and 134b are shown as alternate inputs, through switching means 136, to a single photodetector 138. After the detector output has been amplified by a preamplifier 140, the electronic signals are caused by switching means 142 to alternate between two temporal filters 144a and 144b. Switching means 136 and 142 are so controlled as to synchronize the incoming radiation signals with their respective temporal filters, so that input 134a is always directed to filter 144a, and input 134b is always directed to filter 144b.

FIG. 13B diagrams the same feature as FIG. 13A in a slightly different manner. The element 136a is a switching optical filter which alternates the colors transmitted to detector 138, preamplifier 140, and thence to parallel switched capacitor filters 146a and 146b. The output of the filters is input to a multiplexer 148.

Simultaneous multi-spectral detection, as illustrated in FIGS. 13A and 13B, is highly valuable in providing contrast between target and background radiation. A loss of contrast in one spectral waveband is very unlikely to occur also in other spectral wavebands.

Figure 14:
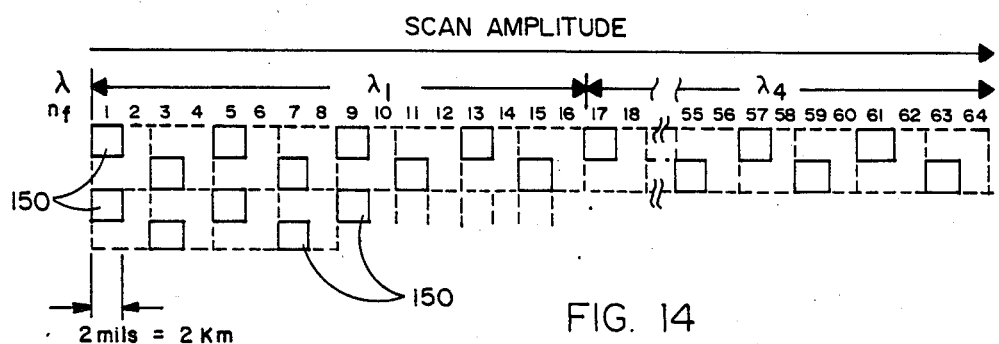

FIG. 14 illustrates a much more ambitious use of the detector time sharing concept. In this arrangement, a linear scan is assumed, having an amplitude of 64 sampling units per scan. This permits combined benefits, such as: (a) four pixels being viewed by each detector, to improve resolution by a factor of two in both dimensions, plus (b) viewing of each pixel by four detectors to permit fourfold detector redundancy, plus (c) viewing each pixel in four colors. The detectors are designated 150. The three blank spaces to the right of each detector plus the detector space constitute the detectors four-pixel viewing area. Each sixteen frames include four detectors. The temporal filters associated with each four consecutive detectors would cause each pixel signal to be viewed by all four of those detectors. The combined resolution and redundancy features would require 16 frames. The lambda symbol indicates that each detector would view each pixel in four spectral wavebands, thus requiring 64 frames per scan. A suggested scan rate is 50 Hertz. This would result in a dwell time of 1/3200 second (1/64×50).

Figure 15:
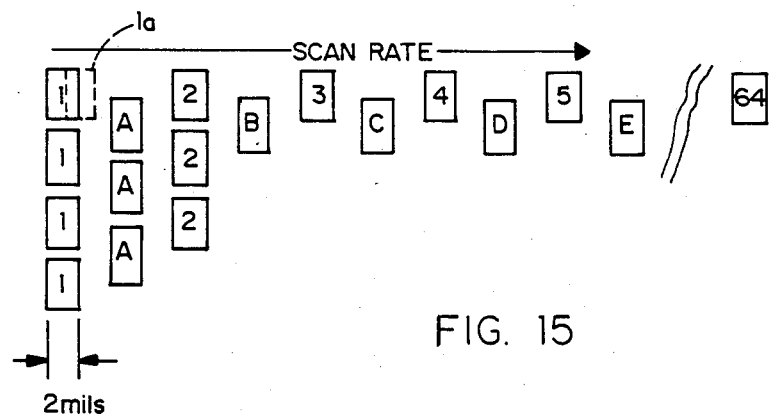

FIG. 15 illustrates the use of pixel overlap to correct by scanning a deficiency inherent in conventional detector staring systems. In such systems, it is possible, for example, for a target to move along a line between adjacent detectors, or to "stand" on a corner between four detectors. In either case, the radiation energy of the target is divided and partially lost.

In FIG. 15, the detectors in the top row are numbered 1, 2, 3, 4, 5, and so on to 64. Assume that: (a) the horizontal dimension of each detector is 2 mils; (b) its vertical dimension is four mils; and (c) the horizontal center-to-center distance between the columns of detectors 1 and 2 is 8 mils. The scanning direction is assumed to be horizontal. A pixel spacing, or resolution, of 2 mils can be obtained by scanning four pixels (each associated with its dedicated temporal filter) between detectors 1 and 2, between detectors 2 and 3, and so on. In order to eliminate the problem of signal loss discussed in the preceding paragraph, the pixels may be overlapped. In other words, by doubling the number of pixels observed between detectors 1 and 2, a 2 to 1 overlapping is obtained, as shown by the dashed line pixel 1a. The number of pixels scanned during a single scanning pattern has been doubled; and the full target amplitude will be observed. In other words, a sample is taken every one-half dwell time.

FIG. 15 also shows vertical columns of detectors (A, B, C, D, etc.) which are located horizontally midway between the columns of detectors 1, 2, 3, 4. The horizontal rows of detectors A, B, C, D are vertically displaced from the adjacent rows of detectors 1, 2, 3, 4, thereby providing detector overlap in the vertical direction. This combines with the pixel overlap in the horizontal direction to ensure full target observation.

An electronic control logic system for a parallel bandpass filter group is illustrated in FIG. 16. The designations PS1 and PS2 represent position select inputs to the integrated circuitry which controls the filter transistor switches incorporated in the switched capacitance circuitry.

Four parallel filters are shown. Each filter has the same four clock-controlled switching lines, designated $\emptyset 1$, $\emptyset 2$, $\emptyset 3$, and 519 4, respectively. The period of on-/off time for each filter is controlled by four nor gates. Filter 1 is controlled by four nor gates 152, 154, 156 and 158, each of which has three input lines. One of the three input lines to nor gate 152 is clock input $\emptyset 4$; one of the three input lines to nor gate 154 is clock input $\emptyset 3$; one of the three input lines to nor gate 156 is clock input $\emptyset 2$; and one of the three input lines to nor gate 158 is clock input $\emptyset 1$.

Filter 2 is controlled by four nor gates 160, 162, 164 and 166. These gates also each receive one of their three inputs from one of the four clock lines. The same applies to nor gates 168, 170, 172 and 174, which control Filter 3, and to nor gates 176, 178, 180 and 182, which control Filter 4.

The remaining two inputs of each nor gate are PS1 and PS2. Each of those lines is directly connected to eight nor gates, and connected through its respective inverter 184 to the other eight nor gates.

Each filter is "on" one-fourth of the time, and "off" three-fourths of the time. This is controlled by the PS1, PS2 code. Filter 1 is on when PS1=1 and PS2=1. Filter 2 is on when PS1=1 and PS2=0. Filter 3 is on when PS1=0 and PS2=0. Filter 4 is on when PS1=0 and PS2=1.

Within each filter, clock line $\emptyset$ is connected to two MOSFET switches 186 and 188; clock line $\emptyset 2$ is connected to two MOSFET switches 190 and 192; clock line $\emptyset 3$ is connected to two MOSFET switches 194 and 196; and clock line $\emptyset 4$ is connected to two MOSFET switches 198 and 200.

The input signal from the detector, which has been amplified by the preamplifier and filtered by the high frequency filter, and which is time-shared by Filters 1, 2, 3 and 4, is received on input line 202. And the separate outputs of the four filters are sent out on their respective output lines 204, 206, 208 and 210. Preferably, both the logic control circuitry and the parallel filters are included in the focal plane circuitry, whereas the clocking circuitry may be away from the focal plane.

FIG. 17 shows diagrammatically the electronics clocking system which provides clock signals to the transistor switches in the filters. A master clock 212 provides input both to a bandpass filter clock generator 214, which provides the clock inputs $\emptyset 1$, $\emptyset 2$, $\emptyset 3$ and 519 4 of FIG. 16, and to a high frequency filter generator 216 which provides clock inputs $\emptyset 5$ and $\emptyset 6$ to the high frequency spatial filters 34 (FIG. 2).

Each of the filter clock generators 214 and 216 is tunable, in order to permit adjustment to change the electronic wavebands allowed to pass through the respective filters. Tuning may be accomplished by a voltage controlled oscillator (VCO) 218 which receives input from a frequency adjust means.

The bandpass filters shown in FIG. 16 require synchronization with the scanning system. This is represented in FIG. 17 by a phase lock loop 220 which is incorporated in the clock generator 214, and which outputs a signal to a motor control 222, and receives an input signal from a scan angle transducer 224. The motor control 222 controls a nutator (motor) 226, which moves a scanning mirror 228. The scan angle transducer provides feedback from the nutator position to phase lock loop 220, and also controls a position select 230 which provides the filter selection inputs of FIG. 16.

The electronic frequencies allowed to pass through the spatial, or high frequency, filters 34 (FIG. 2) may be centered at 1500–1600 Hertz, whereas the electronic frequencies allowed to pass through the temporal, or low frequency, parallel filters 36 may be centered at approximately 1 Hertz. In a typical example, the bandwidth might be approximately one-half of the center frequency. However, a different bandwidth might be chosen.

The temporal filter frequency should be matched to the target dwell time on a pixel, which is a function of target velocity. It is assumed that this velocity will be predetermined by the purpose of the detection system. The spatial filter frequency should be matched to the scanning speed, and the frequency with which a dot or line (i.e., an edge) representing a target would be viewed. For example, the center frequency of the high frequency bandpass would be one-half×(target dwell time)−1. The target dwell time, assuming scanning across 64 pixels at a rate of 50 Hertz, would be 1/3200 second. The peak frequency of the filter, therefore, should be approximately 1600 Hertz.

The above frequency determinations are summarized diagrammatically in FIG. 18. As shown at box 232, the optical scan frequency f(s) must be at least twice the sum of the target velocity and background velocity divided by the detector dimension. Box 234 indicates that the spatial filter is spatially matched to the target. After demultiplexing (box 236), the signal reaches the temporal filter (box 238), which is temporally matched to the target. The output is then fed into a digital data processing system.

There are very important advantages resulting from the combination of (a) each high frequency spatial filter 34 whose input is received from the detector, and (b) the multiple temporal filters 36 whose inputs are received from each spatial filter 34. One advantage of the high frequency spatial filter is that it substantially eliminates 1/f noise. This result is graphically illustrated in FIG. 19. Time is plotted on the X-axis; and intensity (amplitude) is plotted on the Y-axis.

Line A illustrates the incoming radiance which has a background component (essentially DC) represented by horizontal line 240, and a target signal represented by the pulse 242. After the radiance input has been converted into an electronic signal by a specific detector and has been amplified by the detector's preamplifier, it is input to the high frequency spatial filter. This input is illustrated by line B, which shows numerous evenly-spaced vertical lines 244 representing the sampling frequency. This signal includes both the target signal 242, and low frequency (1/f) noise represented by the slowly undulating shape of line 246.

Line C shows the signal after it is filtered by the high frequency spatial filter 34, i.e., the output signal of that filter. The high-frequency vertical sampling lines 244 remain, but the low-frequency noise component has been substantially eliminated. The shape of target signal 242 remains.

Line D shows the output signal from one of the temporal bandpass filters 36. The high-frequency sampling lines 244 have been removed; and the DC background 240 has been removed. What remains is an electronic replica 242 of the analog radiance input provided by the target.

An additional, highly important aspect of the spatial filter/temporal filter combination is its unique ability to solve the problems involved in infrared search and track (IRST) systems.

The previous discussion has referred to the ability of staring detectors to respond to a target which is either moving across the field of view or growing in intensity, while ignoring a background which has neither significant motion nor change in intensity, such as a cloud formation. An essentially opposite condition exists in IRST systems.

In IRST systems, the problem may involve extracting weak target signatures from large, moving background clutter (which may be orders of magnitude larger in amplitude than the target signature). The reason for rapid motion of the background, as seen by the detector system, is that the system is aboard a rapidly moving host vehicle.

Those approaches which attempt to detect targets by their spatial signature alone are unsuccessful due to the presence of this clutter. There are usually many clutter elements in any one frame which are easily mistaken for the target, and these continuously generate false alarms. In addition, the targets are always superimposed upon the larger amplitude background, making the extraction of the target spatial signature extremely difficult unless one assumes a relatively benign background. On the other hand, targets which are on a closing trajectory possess little relative crossing velocity. They, in contrast to the background, do not appear to move rapidly. Attempts to use this target attribute have also been tried. Frames of image data are stored, and interframe processing is used to try to find those elements which do not change with time. This approach has the problem that the small amplitude target is always superimposed upon a large dynamic background, and every part of the image moves from frame to frame, including the elements containing the target. The IRST problem thus reduces to finding a small target which both has the requisite spatial signature, and does not move with the background.

FIGS. 20 and 21 illustrate the present invention applied to an IRST system. In FIG. 20, the image consists of a small unresolved target with a low crossing velocity, v(T), a small amplitude, I(T), and a small extent (roughly the size of a detector element). This target is superimposed upon a fast-moving background [velocity v(B)], of large amplitude, I(b). This image is focused by optics and scanned in such a way that the spatial distribution of image irradiance is converted to a time waveform at each detector site. Time derivatives of each pixel's output are taken electronically to eliminate low spatial frequency components. The sampler samples this time derivative at the same point in the scan on each cycle, generating sampled data pulse trains.

The target, as it drifts through any sampling point at a slow rate, generates a signature whose dwell time is long [proportional to $1/v(T)$]. The background, drifting through at a high rate, dwells only for a short time [proportional to $1/v(B)$]. In effect, all background frequency components are moved higher in frequency than the target by the factor $v(B)/v(T)$. [The conversion factor for spatial frequency, f(s), to temporal frequency, f(t), is $f(t) = vf(s)$]. This difference in temporal frequency may be exploited by use of standard temporal low pass filters to pick up slow targets against a moving background, or high pass filters to extract fast-moving targets against slow backgrounds.

The block diagram shows integrators 250 and differentiators 252 which may be provided by the low pass filters 36 and high pass filters 34, respectively. The bracket 254 indicates the synchronization between the optical/mechanical multiplexing means which causes time-sharing of each detector, and the electronic demultiplexing means which causes the integration required to obtain the staring effect. The differentiators prior to sampling serve to eliminate any low spatial frequencies, and thus to give a "zero-mean" image.

The signal waveforms are as shown graphically in FIG. 21. The use of two integrators serves to simulate a two pole low-pass filter for the extraction of slow targets against fast backgrounds (the generic IRST problem on fast moving host aircraft). The attenuation of background with respect to target is always at least by the ratio $[v(b)/v(T)]^N$ where N is the number of poles (integrators) in the low pass temporal filters.

The output signal-to-noise ratio is $(SNR)_2 = (SNR)_1 [v(B)/v(T)]^N$, where: $(SNR)_2$=output target-to-background ratio; $(SNR)_1$=scene target-to-background amplitude ratio; $v(B)$=crossing velocity of background scene; $v(T)$=crossing velocity of target; and N=number of filter poles. For example, if the initial background is a factor of 100 higher than the target, but at a crossing velocity 10 times higher than the target, the proposed dynamic stare system will give an output signal-to-noise (SNR) ratio of 10 with a 3-pole filter. This SNR will be reached at the end of the target's dwell time on a single detector. Theoretically, the system may be used with higher order filters to increase the effect even more. A 1000:1 clutter-to-target ratio may be converted to a 10:1 SNR with a 4th order filter and a 10:1 background-to target velocity ratio.

A simple example illustrates the viability of the system. Assume a background of full scale square waves whose peak second derivative is $1A/sec^2$ as limited by the optics (see FIG. 21, lines A B and C). As the square wave moves through any particular detector element, it generates the sampled output shown in line E, where we have assumed a 0.01 second dwell time for any feature in the background. The target signal is assumed to be an unresolved point (guassian blur function) whose peak second derivative is 0.01 A/sec$^2$, a factor of below the background (see FIG. 21, lines B and D). It's dwell-time is one (1) second, and it generates sampled signal shown in line F. (Note the wide difference in time scale on lines E and F). A two-pole filter is used on the sampled data waveforms, and lines G and H show the two outputs. Note that a signal-to-noise ratio of 100:1 is reached after one second.

FIG. 22 shows a block diagram of a complete dynamic stare system, which adds a useful feature to the system diagrammed in FIG. 2. As shown, each detector 260 outputs to its preamplifier 262. Then the signals from the detector are filtered by its spatial filter 264, after which the signals are demultiplexed and directed to a plurality of parallel temporal filters 266, which are synchronized with the pixel scanning mechanism. The outputs of the temporal filters are connected to a multiplexer 268.

The primary difference from the system of FIG. 2 is the inclusion of a direct, unfiltered access line 270, which conveys the amplified signal of the detector to an image processor 272. The purpose of this feature is to permit the central computer to obtain unlimited information about a target, once it has been determined that there is a target of interest. In other words, more detailed information about the target may be desired, in addition to the information which passes through the filters.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A radiation sensing and decoding system comprising:
    an array of radiative/electronic transducer sensors each of which transmits signals independently of the other sensors;
    a plurality of pixels observed by each sensor on a time-sharing basis;
    a plurality of filters which receive as inputs the signals transmitted by each sensor; and
    synchronizing means which control the operative time of each filter and which insure that it receives all of its input signals from the same pixel.

2. A radiation sensing and decoding system comprising:
    a plurality of photodetectors arranged in a two-dimensional focal plane, each detector having an individual electronic output;
    scanning means, operating between the detectors and the observed radiation, for the purpose of causing each detector to view serially a plurality of separate radiation sources;
    means for demultiplexing the electronic output signal of each detector to provide a plurality of parallel signals; and
    means for synchronizing the scanning means to the demultiplexing means to insure that each parallel detector output signal receives input from the same radiation source at intervals determined by the scanning repetition frequency.

3. The system of claim 2 wherein:
    the demultiplexing means comprises a plurality of temporal bandpass filters connected in parallel to receive, on a time-sharing basis, the output signal from a single photodetector; and
    the synchronizing means includes switching means which cause each of the temporal bandpass filters to be switched on while the others are switched off.

4. The system of claim 3 wherein each of the temporal bandpass filters includes:
    one or more high pass filters having a capacitor and a resistance-equivalent switched capacitance circuit; and
    one or more low pass filters having a capacitor and a resistance equivalent switched capacitance circuit;
    all switches in the switched capacitance circuits being switched off during the period when the respective bandpass filter is switched off by the synchronizing means, thereby isolating the charges of the capacitors in that filter until it is again switched on.

5. The system of claim 4 in which all switches which are either in the temporal bandpass filters or are used to switch those filters on and off are MOSFET transistors.

6. The system of claim 3 which also comprises:
    a high frequency spatial filter in the circuit between each photodetector and the plurality of temporal bandpass filters which time-share the photodetector.

7. The system of claim 6 which also comprises:
    preamplifier circuitry in series between each photodetector and its high frequency spatial filter.

8. The system of claim 4 wherein each temporal filter is matched to a particular pixel in the observed radiation field.

9. The system of claim 8 in which:
    the center-to-center distance between pixels is a fraction of the center-to-center distance between photodetectors; and
    the scanning means causes each photodetector to view several spaced pixels, thereby increasing the resolution of the image received from the focal plane.

10. The system of claim 8 in which:
    the scanning means causes each pixel to be viewed by a plurality of detectors, thereby providing redundant output signals.

11. The system of claim 10 which also comprises:
    electronic logic circuitry for selecting a preferred output signal level from the redundant responses of a plurality of photodetectors to a single pixel.

12. The system of claim 11 in which:
    the center-to-center distance between pixels is a fraction of the center-to-center distance between photodetectors; and
    the scanning means causes each photodetector to view several spaced pixels, thereby increasing the resolution of the image received from the focal plane.

13. The system of claim 12 in which:
    the frequency of pixel sampling is sufficient to cause overlapping of pixels, thereby oversampling to improve the image quality of the system.

14. The system of claim 8 in which:
    the scanning means causes a single pixel to be separately viewed by a photodetector in a plurality of spectral wave bands.

15. The system of claim 4 which also comprises:
means for tuning the switching frequency of the switches in the switched capacitance circuits, thereby varying the electronic signal frequencies which pass through the temporal bandpass filters.

16. The system of claim 6 in which:
the spatial filter includes one or more high pass filters having a capacitor and a resistance-equivalent switched capacitance circuit.

17. The system of claim 16 which also comprises:
means for tuning the switching frequency of the switches in the switched capacitance circuit, thereby varying the electronic signal frequencies which pass through the spatial filter.

18. The system of claim 3 in which the temporal bandpass filters are located at the focal plane.

19. The system of claim 6 in which the spatial filter is located at the focal plane.

20. The system of claim 19 in which the temporal bandpass filters are located at the focal plane.

21. The system of claim 7 in which the preamplifier circuitry and the spatial filter are located at the focal plane.

22. The system of claim 21 in which the temporal filters are located at the focal plane.

23. The system of claim 15 in which the frequency to which the temporal bandpass filters are tuned is a function of the velocity of the intended target of observation.

24. The system of claim 17 in which the frequency to which the spatial filter is tuned is a function of the scan speed across each pixel.

25. The system of claim 6 in which:
each of the temporal filters includes resistance-equivalent switched capacitance circuitry, the switching frequency of which is adjustable to tune the temporal filter pass-through frequency; and
the spatial filter includes resistance-equivalent switched capacitance circuitry, the switching frequency of which is adjustable to tune the spatial filter pass-through frequency.

26. The system of claim 25 in which the frequency to which the temporal filters are tuned is a function of the velocity of the intended target of observation, and the frequency to which the spatial filter is tuned is a function of the scan speed across each pixel, in order to provide target versus background discrimination regardless of their motion characteristics.

* * * * *

UNITED STATES PATENT AND TRADEMARK OFFICE
CERTIFICATE OF CORRECTION

PATENT NO. : 4,675,532
DATED : June 23, 1987
INVENTOR(S) : John C. Carson

It is certified that error appears in the above-identified patent and that said Letters Patent is hereby corrected as shown below:

Column 4, line 1: After "14,", insert -- and 15 --

Column 11, line 33: Delete "519", and insert instead -- ∅ --

Column 12, line 9: Delete "519", and insert instead -- ∅ --

Column 12, lines 48 & 49: Change "(target dwell time)-1" to -- (target dwell time)$^{-1}$ --

Column 14, line 23: After "is", the equation should read -- $f(t) = vf(s)$ --

Column 14, line 65: Delete the letter "B"

Column 15, line 3: After "a factor of", insert -- 100 --

Signed and Sealed this

First Day of December, 1987

Attest:

DONALD J. QUIGG

Attesting Officer

Commissioner of Patents and Trademarks